United States Patent Office 2,807,618
Patented Sept. 24, 1957

2,807,618

SYNTHESIS OF PYRIDINE AND 3-PICOLINE

Francis E. Cislak and William R. Wheeler, Indianapolis, Ind., assignors to Reilly Tar & Chemical Corporation, Indianapolis, Ind., a corporation of Indiana No Drawing. Application March 29, 1956,
Serial No. 574,592

8 Claims. (Cl. 260—290)

This invention relates to a process of preparing pyridine and 3-picoline. More specifically, it relates to a process of preparing pyridine and 3-picoline by the interaction of acetylene or acetaldehyde with ammonia and a formaldehyde hemiacetal.

Our present invention is a continuation-in-part of our application Serial No. 394,490 filed November 25 1953, now Patent No. 2,744,904, and of our application Serial No. 410,044 filed February 12, 1954.

In our co-pending application Serial No. 394,490 (Patent No. 2,744,904 we disclose and claim the process of preparing pyridine and 3-picoline by the interaction of acetylene (or acetaldehyde), ammonia, and methanol. In our co-pending application Serial No. 410,044 we disclose and claim the process of preparing pyridine and 3-picoline by the interaction of acetylene (or acetaldehyde), ammonia, and formaldehyde.

We have now found that we can obtain greatly improved results by the interaction of acetaldehyde (or acetylene), ammonia, and a mixture of methanol and formaldehyde. It is this new and improved process which is the subject of our present invention.

When an equimolecular mixture of formaldehyde and methanol is prepared, an exothermic reaction occurs with the formation of a methyl formaldehyde hemiacetal in accordance with the equation given below:

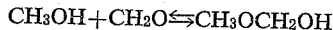

The hemiacetals are unstable compounds and have not been isolated in the pure state. The reaction by which the hemiacetal is formed is a reversible one. Also, the reaction may proceed further to form methylal:

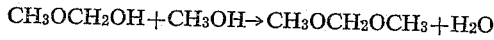

The comparatively unstable character of the formaldehyde hemiacetal and the reversible nature of the reaction by which it is formed makes is possible for most purposes to regard the hemiacetal as a solution or mixture of formaldehyde and methanol.

In carrying out our invention we prepare a mixture of methanol and formaldehyde. To this mixture there is added acetaldehyde. The methanol-formaldehyde-acetaldehyde solution is vaporized, mixed with gaseous ammonia, and the resultant mixture is passed through a suitable reactor containing a catalyst. The temperature of the reactor is maintained between about 400° C. and 550° C. and preferably between about 450° C. and 500° C. We prefer to conduct our process in a continuous manner although that is not necessary.

The reactor used may be of various types. We prefer the fluid catalyst type, similar to those normally used in carrying out cracking operations in the petroleum industry. Such reactors are of tubular form with suitable connections at entrance and exit. They are provided with means for supporting the fluid bed of catalyst, and are provided with any convenient means for heating them.

The catalyst used may be any of the large number of catalysts which are useful in the preparation of 2-picoline and 4-picoline from acetylene and ammonia.

A highly satisfactory way of carrying out our invention is as follows. The parts are by weight.

*Example 1*

To 67 parts of an aqueous formaldehyde solution containing 45% formaldehyde, we add 32 parts of methanol. Considerable heat is evolved during the addition. We therefore add the methanol slowly in small portions, continually agitating the mixture during the addition. To the above prepared formaldehyde hemiacetal solution we add 62 parts of acetaldehyde. The resulting acetaldehyde-formaldehyde hemiacetal solution, hereafter referred to as AFH, is vaporized and mixed with ammonia to prepare a gaseous mixture composed of 4.5 parts of AFH and one part of ammonia. We pass the mixture of vapors through a fluid catalyst type reactor containing a fluidized catalytic bed of silica-alumina catalyst (13% alumina). The temperature of the reactor is maintained at about 500° C. As the vapors of ammonia, acetaldehyde, and AFH pass through the reactor, a reaction occurs whereby pyridine and 3-picoline are formed. The vapors of the unchanged reactants and the reaction products are condensed as they emerge from the reactor, and the condensate is collected in a suitable receiver. The condensate as recovered contains about 72% water. This water may be removed by the addition of flake caustic soda. The crude dry bases amount to about 47 parts. The crude dry bases are fractionated to recover pyridine and 3-picoline. The pyridine recovered amounts to about 35% and the 3-picoline amounts to about 27%. The 3-picoline has a purity of more than 95%, indicating that little if any 4-picoline is formed.

Instead of using acetaldehyde we may use acetylene (which is dehydrated acetaldehyde). If we use acetylene in the process of Example 1, we prepare a gaseous mixture of formaldehyde-hemiacetal, acetylene, and ammonia and pass the resultant mixture through our reactor.

In place of the silica-alumina catalyst, we may use a large number of other catalysts. Among the catalysts which we have found useful in carrying out our reaction are the catalysts which have been found useful in the preparation of 2-picoline and 4-picoline from acetylene and ammonia. Such catalysts include, in addition to the silica alumina catalyst of Example 1, alumina, silica, silica-magnesia, fuller's earth, pumice, zinc chloride, zinc fluoride, cadmium chromate, cadmium chloride, zinc phosphate, and the like.

Our invention does not reside in the discovery of a new catalyst. What we have discovered is that the interaction of acetaldehyde (or acetylene), ammonia, and a formaldehyde hemiacetal yield pyridine and 3-picoline in greatly improved yields.

In Example 1 the molecular equivalents of the reactants used are acetaldehyde 1.5 mols, formaldehyde hemiacetal 1 mol (or 1 mol formaldehyde and 1 mol methanol), ammonia 2.4 mols. We need not, however, use the specific molal ratios of Example 1. The proportions of the reactants may be varied widely. In general, we prefer to use an excess of ammonia although that is not necessary. We find that if we wish to prepare 3-picoline which is not contaminated by substantial quantities of 4-picoline, the reaction mixture should preferably contain not more than 2 mols of acetaldehyde for each mol of formaldehyde hemiacetal; preferable the mixture should contain 1½ mols (or less) of acetaldehyde (or acetylene) for each mol of formaldehyde hemiacetal.

While we prefer in making our formaldehyde hemiacetal to react 1 mol of formaldehyde with 1 mol of methanol, that is not necessary. We may instead use an excess of either formaldehyde or of methanol and use the resultant mixture in place of the 1:1 molar mixture of Example 1. Also, for convenience we prefer to mix an aqueous formaldehyde with the methanol. We may, however, react paraformaldehyde with the methanol to form the formaldehyde hemiacetal.

The temperature at which our reaction may be conducted may be varied widely. In general, we prefer to have the reaction temperatures above about 400° C. and below about 550° C. It has been our experience that at temperatures below about 400° C., too large a proportion of the reactance pass through without reacting. At temperatures above about 550° C., we find that our catalyst becomes inactivated more rapidly and we obtain too many side reactions. More desirably, we prefer that the reaction temperature should be between about 450° C. and 500° C.

We do not understand the reaction mechanism of our process. It is entirely unexpected that the interaction of ammonia and acetaldehyde with a mixture of methanol and formaldehyde should give greatly improved yields over the reaction of ammonia and acetaldehyde with formaldehyde or with methanol.

We claim as our invention:

1. The process of preparing pyridine and 3-picoline which comprises an interaction of a compound of the class consisting of acetylene and acetaldehyde with ammonia, formaldehyde, and methanol in the presence of a catalyst useful in the preparation of picolines from acetylene and ammonia.

2. The process of preparing pyridine and 3-picoline which comprises mixing the vapors of acetaldehyde, ammonia, formaldehyde, and methanol, passing the resultant mixture through a reactor containing a catalyst useful in the preparation of picolines from acetylene and ammonia maintained at an elevated temperature, and recovering pyridine and 3-picoline from the reaction product.

3. The process of preparing pyridine and 3-picoline which comprises mixing the vapors of acetaldehyde, ammonia, formaldehyde, and methanol, passing the resultant mixture through a reactor containing a catalyst useful in the preparation of picolines from acetylene and ammonia maintained at a temperature between about 400° C. to about 550° C. and recovering pyridine and 3-picoline from the reaction product.

4. The process of preparing pyridine and 3-picoline which comprises mixing the vapors of acetaldehyde, ammonia, formaldehyde, and methanol, passing the resultant mixture through a reactor containing a silica-alumina catalyst maintained at a temperature between about 450° C. to about 500° C., and recovering pyridine and 3-picoline from the reaction product.

5. The process of preparing pyridine and 3-picoline which comprises preparing a gaseous mixture composed of about 1.5 mols of acetaldehyde, about 1 mol of formaldehyde, about 1 mol of methanol, and about 2.4 mols of ammonia, passing the resultant mixture through a reactor containing a silica-alumina catalyst maintained at a temperature of about 500° C., and recovering pyridine and 3-picoline from the reaction product.

6. The process of preparing pyridine and 3-picoline which comprises preparing a mixture comprising formaldehyde, acetaldehyde, and methanol, vaporizing the resultant mixture, mixing the vapors with ammonia, passing the resultant gaseous mixture through a reactor containing a catalyst maintained at a temperature between about 400° C. to about 550° C. and recovering pyridine from the reaction product.

7. The process of claim 4 in which an alumina catalyst is used.

8. The process of preparing pyridine and 3-picoline which comprises preparing a gaseous mixture comprising acetylene, formaldehyde, methanol, and ammonia, passing the resultant mixture through a reactor containing a zinc fluoride catalyst maintained at a temperature between about 400° C. to about 500° C. and recovering pyridine from the reaction product.

References Cited in the file of this patent

UNITED STATES PATENTS 2,700,042     Aries                 Aug. 30, 1952

OTHER REFERENCES

Ser. No. 387,106, Stitz (A. P. C.), published July 13, 1943.